Jan. 1, 1957     R. R. DOUGLAS     2,775,891

TANGENTS

Filed Aug. 4, 1954     2 Sheets-Sheet 1

INVENTOR.
Robert R. Douglas
BY
Ralph Hammar
Attorney ns patent office 2,775,891
Patented Jan. 1, 1957

2,775,891

TANGENTS

Robert Ritson Douglas, Erie, Pa., assignor to American Meter Company, Incorporated, Erie, Pa., a corporation of Delaware Application August 4, 1954, Serial No. 447,798

5 Claims. (Cl. 73—281)

This application is a continuation-in-part of application Serial No. 391,639, filed November 12, 1953, now Patent 2,741,122.

This invention is intended to improve the gas meter tangent by having the angular adjustment center offset from the crankshaft center on the lagging side as regards the direction of rotation of the crankshaft so as to make a change in tangent length with angular adjustment off-setting or compensating for changes in the proof of the meter at either the open (high) or check (low) rates. This simplifies the adjustment. For example, if the open rate is compensated, the adjustment of the meter can be made in two steps: (1) Adjusting the length of the tangent to bring the open rate of 100 proof and (2) adjusting the angle of the tangent to bring the check rate of 100 proof. Another feature is the location of the tangent adjustment in line with the gas inlet fitting so adjustment can be made through the inlet fitting without removing any additional parts.

Figure 1:
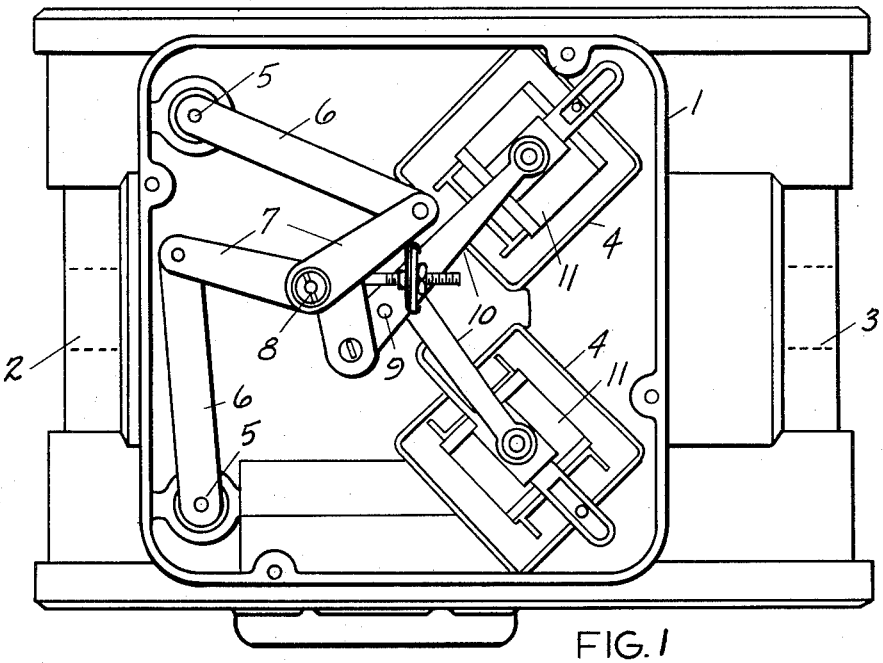
Figure 2:
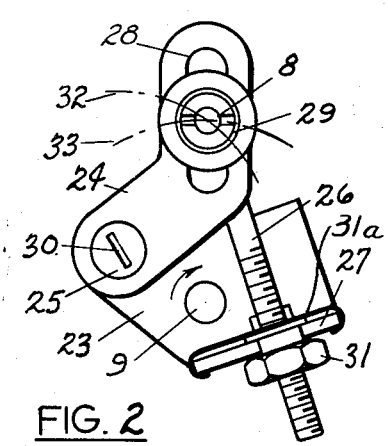
Figure 3:
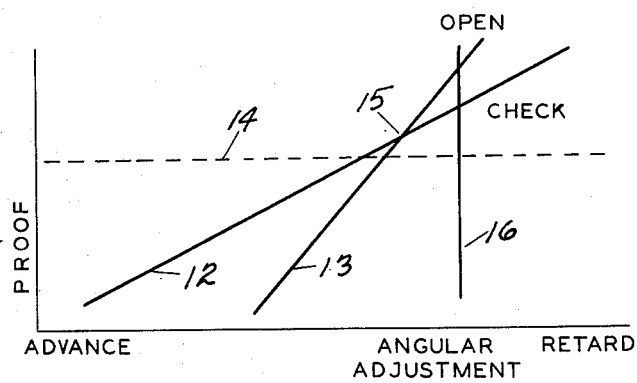
Figure 4:
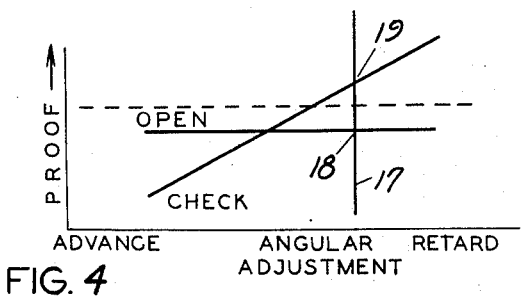
Figure 6:
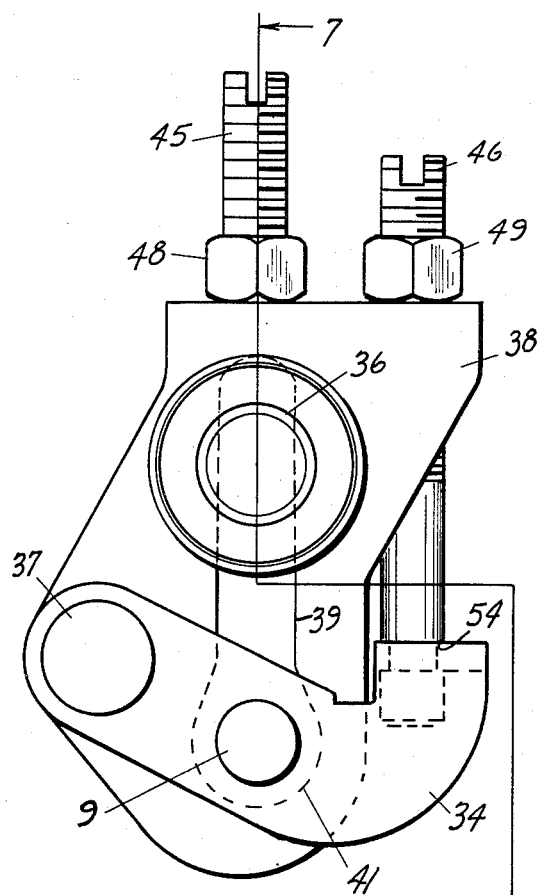
Figure 7:
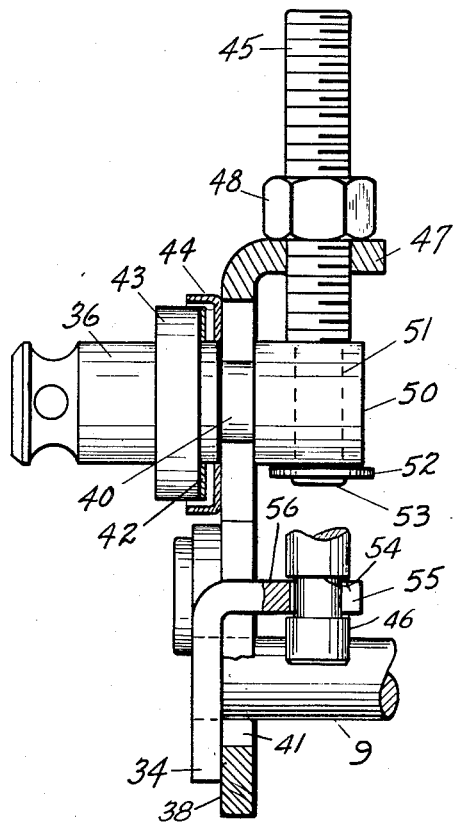
Figure 5:
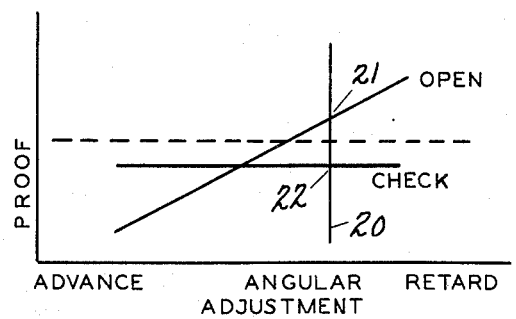

In the drawing, Fig. 1 is a top plan view of the gas distributing chamber; Fig. 2 is a top plan view of the tangent; Fig. 3 is a diagram of the operation of the conventional tangent; Fig. 4 is a diagram of operation of the present tangent when set for constant open rate; Fig. 5 is a diagram of operation of the present tangent when set for constant check rate; Fig. 6 is a top plan of a modification of the tangent; Fig. 7 is a sectional view on line 7—7 of Fig. 6.

In Fig. 1, the conventional parts of the gas meter are readily identified, 1 being the gas distributing chamber provided with inlet and outlet fittings 2 and 3 for connecting to the gas lines, 4 being the valve chambers controlling the flow of gas into and out of the gas measuring chambers (not shown), 5 being the flag rods fixed to the crank arms 6 connected by links 7 to the wrist pin 8 of a tangent fixed at 9 to the crankshaft having the usual crank connected by arms 10 to slide valves 11 on the valve chambers 4. Except for the tangent, the parts so far described are or may be of conventional construction.

The volume of gas successively taken in and discharged from each of the measuring chambers depends upon the length of stroke of the flag rod 5 which is determined by the distance of the wrist pin 8 from the crankshaft 9 and also depends upon the timing of the valves 11. If the valves 11 are timed fast, less gas will be taken into the measuring chambers, while if the valves are timed slow, more gas will be taken in, because the added time for gas admission will tend to blow the measuring diaphragms to a larger volume. The parts for fixing the length of the stroke and the timing of the valves are known in the gas meter art as the tangent. To adjust the accuracy of registration of the meter, it is necessary that the tangent connecting the flag rods 5 to the crankshaft 9 be adjustable both as to length of stroke and as to angular relation with reference to the crank controlling the valves.

Unfortunately, the angular adjustment of the tangent with reference to the crankshaft 9 has heretofore had a different effect at the high and low rates of flow known in the art as the open rate and the check rate. In Fig. 3, line 12 shows the variation in proof or percentage registration with angular adjustment at the low or check rate of flow, line 13 shows the variation in proof with angular adjustment at the high or open rate of flow and dotted line 14 is the hundred-proof line which corresponds to correct registration of the meter. The curves shown in Fig. 3 are for typical prior art tangents. With these tangents, if the angular adjustment were at the point indicated by the reference numeral 15, the meter could be brought to one hundred proof at both the open and check rates by merely adjusting the length of the tangent. However, when the meter is assembled, the angular adjustment will invariably be at some other point, for example, that indicated by the line 16 in which case both the open and check rates would be at different proofs. If one of these is brought to one hundred proof by adjusting the length of the tangent, the other will be off proof and while the meter can be brought to one hundred proof at both the open and check rates, it will be necessary to successively adjust both the angle and length of the tangent until the open and check rates are brought to one hundred proof. This invariably has involved multiple adjustments, the number depending to a considerable extent upon the skill of the operator.

Figs. 4 and 5 show the operation of tangents constructed in accordance with the present invention. In Fig. 4, the tangent is adjusted so that the open or high rate is independent of the angular adjustment. With this tangent, the meter can be brought to one hundred proof by merely adjusting the length of the tangent until the open rate is at one hundred proof and then adjusting the tangent angle until the check rate is at one hundred proof. In Fig. 5 where the check rate is independent of the angular adjustment, the same two steps are needed, namely, adjusting the length of the tangent until the check rate is at one hundred proof and then adjusting the angle of the tangent until the open rate is at one hundred proof. This eliminates the multiple adjustments needed in tangents having the operating characteristics shown in Fig. 3.

For example, referring to Fig. 4, if the meter as assembled has the adjustments indicated by line 17, with the open rate at point 18 and the check rate at point 19, the meter would be brought into correct registration by adjusting the open rate so as to bring point 18 up to one hundred proof and then by adjusting the tangent angle so as to bring the check rate down to one hundred proof. Similarly, if in Fig. 5, the meter as assembled has the adjustment indicated by the line 20 with the open rate at point 21 and the check rate at point 22, the meter can be brought into correct registration by adjusting the length of the tangent so as to bring point 22 up to one hundred proof and then by adjusting the angle of the tangent so as to bring point 21 down to one hundred proof. In both the Figs. 4 and 5 tangents, the adjustment is greatly simplified by the fact that the angular adjustment of the tangent does not affect the accuracy of the registration of the meter for one of the rates of flow for which the meter is adjusted.

The tangent for producing the characteristics illustrated in Figs. 4 and 5 is shown in Fig. 1 and Fig. 2. As there shown, the tangent comprises three parts: A bracket 23 fixed to the crankshaft 9, a lever 24 pivoted at 25 on the bracket 23, and an adjusting screw 26 extending between a flange 27 on the bracket 23, and the wrist pin 8. The connection between the screw 26 and the wrist pin 8 may be the same as the connection between the screw 45 and the pin 36 illustrated in Fig. 7. The wrist pin 8 is received in a slot 28 in the lever 24 and can be locked in any selected position by tightening a nut 29 threaded on the upper portion of the wrist pin and clamping the wrist pin in the slot 28. The pivoting of the lever 24 about 25 can also be locked by tightening the screw 30. With this construction, the adjustment of the length of the tangent, that is, the distance between the crankshaft 9 and the wrist pin 8 can be linearly adjusted along the slot 28 along the center line of the wrist pin and the crankshaft by means of the nut 31 rotatably anchored in the flange 27 and threaded on the adjusting screw 26. Before the wrist pin can be adjusted, the nut 29 must be loosened and when the tangent has been adjusted into the correct length, tightening the nut 29 locks the tangent in the adjusted position. The angular adjustment of the tangent is effected by loosening the screw 30 and then pivoting the lever 24 about the point 25 by turning the nut 31 rotatably anchored in flange 27. A spring clip 31a takes up the play between the nut 31 and the flange 27. This does not change the position of the wrist pin in the slot 28, but does swing the lever 24 about the point 25 as indicated by arc 32, the screw 26 tilting slightly in the flange. This changes the effective length of the tangent in each angular position by the difference between the arc 32 centered on the point 25 and the arc 33 centered on the crankshaft 9. The pivot point 25 must be located lagging behind a center line connecting the crankshaft 9 and wrist pin 8 as regards the direction of rotation of the crankshaft (clockwise in Fig. 2) so that as the valve timing is advanced the tangent will be lengthened and as the valve timing is retarded the tangent length is shortened. The location of the pivot point 25 is not critical. By properly locating the pivot point 25, the change in effective length of the tangent can be made to exactly compensate for the change in registration at either the check or open rates of flow. This makes the registration for the selected rate of flow independent of angular adjustment. In effect, the angular adjustment introduces a compensation into the effective length of the tangent for one of the check or open rates of flow which prevents any change in percentage registration or proof at that rate of flow no matter how the angular adjustment is made. This, of course, cannot be effective for absurd angular adjustments, because the compensation depends upon the difference between two arcs 32 and 33. However, for the practical range of angular adjustment, plus or minus 15°, practical compensation can be obtained. To obtain this compensating effect, it is necessary that the angular adjustment of the tangent be about a point offset on the lagging side as regards the direction of rotation of a center line connecting the wrist pin 8 and the crankshaft 9. The offsetting of the pivot point 25 for the angular adjustment of the tangent from the crankshaft 9 introduces the possibility of having the effective length of the tangent compensate for the change in proof with angular adjustment at any selected rate. For example, referring to the conventional tangent having the performance characteristics illustrated in Fig. 3, as the angular adjustment is made in the direction to advance the valve timing, or to shut off the intake to the measuring chambers in advance of the flow stroke of the flag rod, the proof would normally fall off as indicated by lines 12 and 13. However, with the present tangent, as shown in Fig. 2, as the angular adjustment is made in the direction to advance the valve timing (counter-clockwise in Fig. 2) the wrist pin 8 moves along arc 32 and the distance from the crankshaft 9 to the arc 32 is increased by an amount to prevent the falling off in percentage registration or proof for either the open or check rates. Since the change in percentage registration is different for both the open and check rates of flow, it is not possible to make both of these independent of the angular adjustment. However, it is possible by proper selection of the amount of offsetting of the pivot point 25 to obtain practical compensation for one of the rates of flow so that at that rate of flow (either the check or open rate) angular adjustment of the tangent will not affect the proof. Because of the variations in different meters, the amount of offset of the angular adjustment pivot point 25 will also vary for different meter constructions. However, in all meters, the offsetting of the angular adjustment pivot point to one side of the crankshaft offers the possibility of compensating one of the rates of flow for the variations in proof with angular adjustment inherent in all tangents where the pivot point for angular adjustment is not offset to one side of the center line connecting the crankshaft and wrist pin.

The tangent shown in Figs. 1 and 2 is accessible for adjustment from the top of the gas distributing chamber 1. In some cases where the cover of the gas distributing chamber is permanently sealed in place, the top of the gas distributing chamber is not open and in this case the tangent shown in Figs. 6 and 7 may be used. The tangent of Figs. 6 and 7 is arranged in line with the inlet fitting 2 so that it is accessible for adjustment through the inlet fitting 2. In this tangent, there is a bracket 34 fixed to the crankshaft 9 for example by soldering. Offset on the lagging side of a center line connecting the crankshaft 9 and the wrist pin 36 is a pivot 37 for a lever 38 having a slot 39 slidably receiving a reduced portion 40 at an intermediate section of the wrist pin 36. The slot 39 is centered on a center line connecting the wrist pin 36 with the crankshaft 9. Because the lever 38 is to pivot about the pin 37, the slot 39 has an enlargement 41 to clear the crankshaft 9. The wrist pin 36 is held firmly against the upper surface of the lever 38 by a spring washer 42 arranged between a collar 43 on the wrist pin and a retaining cup 44 which rides on the upper surface of the lever 38.

The tangent is adjusted by two adjusting screws 45 46 both threaded through a depending flange 47 on the lever 38 and respectively held in place by lock nuts 48 and 49. The adjusting screw 45, which is arranged on a center line connecting the crankshaft 9 and the wrist pin 36, has its inner end rotatably anchored in the depending portion 50 of the wrist pin. This anchoring is effected by having a smooth reduced section 51 on the adjusting screw extending through a bore in the depending portion 50 of the wrist pin and held therein by a washer 52 and a peened-over portion 53. By turning the adjusting screw 45, the wrist pin 36 is moved toward and away from the crankshaft 9 along a center line connecting the crankshaft and wrist pin to change the length of stroke without changing the timing of the valves. When the stroke of the wrist pin has been adjusted by the adjusting screw 45, the screw is locked in place by the lock nut 48.

Angular adjustment of the wrist pin 36 with relation to the crankshaft 9 to advance or retard the valve timing is effected by the adjusting screw 46, which has its smooth inner end provided with an annular groove 54 received in a slot 55 in a flange 56 depending from the bracket 34 connected to the crankshaft 9. The groove 54 anchors the inner end of the adjusting screw to the bracket 34 so that as the adjusting screw is threaded in or out of the flange 47 the lever 38 is pivoted about the pivot pin 37. While the lever 38 is being pivoted about the pin 37, the wrist pin 36 does not move along the slot 39, because it is held in a fixed position by the adjusting screw 45. However, because the pivoting of the lever 38 is about the pin 37, the distance between the wrist pin 36 and the crankshaft 9 changes in the same manner as in the Figs. 1 and 2 construction and introduces compensation for either the check or open rates as shown in either Fig. 4 or Fig. 5. Once the angular adjustment has been set to the desired value, the adjusting screw 46 is held in the set position by the lock nut 49.

When the Fig. 6 and Fig. 7 tangent is substituted in Fig. 1, the adjusting screws 45 and 46 will be accessible through the gas inlet fitting 2 when the parts are in essentially the position shown in Fig. 1. There is accordingly no need to remove any part of the meter in order to make the necessary tangent adjustments. As in the Fig. 1 and Fig. 2 tangent, only two adjustments are necessary. The adjustment of the stroke of the tangent by adjusting screw 45 moves either the open or check rates to 100 proof as shown in Figs. 4 and 5. The angular adjustment of the valve timing by set screw 46 then moves either the check or the open rates to 100 proof. These two adjustments are independent of each other in the same manner as in the Fig. 1 and Fig. 2 tangent.

What is claimed as new is:

1. In a tangent, a wrist pin, a bracket adapted to be fixed to a crankshaft, a lever pivoted on the bracket at a point laterally offset on the lagging side as regards the direction of rotation of the crankshaft of a center line connecting the crankshaft and wrist pin, means mounting the wrist pin on the lever for movement relative to the lever along said center line and for pivotal movement with the lever about its pivot, releasable means for locking the lever in any selected angular relation to the bracket, and other releasable means for locking the wrist pin to the lever in any selected position along said center line.

2. In a tangent, a wrist pin, a bracket adapted to be fixed to a crankshaft, a lever pivoted on the bracket at a point laterally offset on the lagging side as regards the direction of rotation of the crankshaft of a center line connecting the crankshaft and wrist pin, and having a slot extending along the center line in which the wrist pin is slidably received, releasable means for locking the wrist pin in any selected position in said slot, and releasable means for locking the lever in any selected angular relation to the bracket.

3. In a tangent, a wrist pin, a bracket adapted to be fixed to a crankshaft, a lever pivoted on the bracket at a point laterally offset on the lagging side as regards the direction of rotation of the crankshaft of a center line connecting the crankshaft and wrist pin and having a slot extending along the center line in which the wrist pin is slidably received, releasable means for locking the wrist pin in any selected position in said slot, releasable means for locking the lever in any selected angular relation to the bracket, and an adjusting screw connected between the wrist pin and bracket whereby the wrist pin can be moved along the slot by the adjusting screw upon release of the first locking means and whereby the wrist pin can be moved angularly about the pivot of said lever upon release of the second locking means.

4. In a gas meter having a gas distributing chamber with a bottom wall and with a side wall extending above the bottom wall, a vertical crankshaft extending above said bottom wall, a bracket fixed to said shaft, a vertical wrist pin, a plate having a guide slot in which the wrist pin is slidably received, said slot extending on a center line connecting the crankshaft and wrist pin, a pivot for the plate on the bracket at a point laterally offset on the lagging side as regards the direction of rotation of the crankshaft from a center line connecting the crankshaft and wrist pin, an adjusting screw threaded in the plate and cooperating with the wrist pin to move it along the guide slot, another adjusting screw threaded in the plate cooperating with the bracket to move the plate relative to the bracket about said pivot, there being a gas line inlet connection in said side wall opposite said adjusting screws through which adjustment of the tangent can be effected.

5. In a tangent, a bracket adapted to be fixed to a crankshaft, a wrist pin, a plate having a guide slot in which the wrist pin is slidably received, said slot extending along a center line connecting the wrist pin and crankshaft, a pivot for the plate on the bracket laterally offset on the lagging side as regards the direction of rotation of the crankshaft from a center line connecting the crankshaft and wrist pin, adjusting means connected between the plate and wrist pin for moving the wrist pin along the slot, and adjusting means connected between the plate and bracket for moving the plate relative to the bracket about said pivot.

References Cited in the file of this patent

UNITED STATES PATENTS

| | | |
|---|---|---|
| 1,212,729 | Armstrong | Jan. 16, 1917 |
| 1,826,850 | Weymouth | Oct. 13, 1931 |
| 1,892,827 | Brower et al. | Jan. 3, 1933 |
| 1,893,022 | Douillard | Jan. 3, 1933 |
| 2,713,792 | Benson | July 26, 1955 |

FOREIGN PATENTS

| | | |
|---|---|---|
| 257,720 | Great Britain | Sept. 9, 1926 |